(12) United States Patent
Gonzalez et al.

(10) Patent No.: US 7,120,210 B1
(45) Date of Patent: Oct. 10, 2006

(54) METHOD AND SYSTEM FOR PROCESSING A SIGNAL

(75) Inventors: Juan G Gonzalez, Wilmington, DE (US); Salim Manji, Edison, NJ (US); Jose L Paredes, Merda (VE)

(73) Assignee: Lucent Technologies Inc., Murray Hill, NJ (US)

( * ) Notice: Subject to any disclaimer, the term of this patent is extended or adjusted under 35 U.S.C. 154(b) by 853 days.

(21) Appl. No.: 10/155,377

(22) Filed: May 24, 2002

(51) Int. Cl.
*H03D 1/04* (2006.01)
*H04B 1/10* (2006.01)
*H04L 1/00* (2006.01)
*H04L 27/22* (2006.01)

(52) U.S. Cl. .................. 375/346; 375/324; 375/329
(58) Field of Classification Search ............. 375/322, 375/324, 329, 340, 341, 346
See application file for complete search history.

(56) References Cited

U.S. PATENT DOCUMENTS

| 5,088,113 A * | 2/1992 | Wei ........................... 375/280 |
| 6,330,702 B1 | 12/2001 | King ........................ 714/819 |
| 6,343,105 B1 | 1/2002 | Saegusa ..................... 375/341 |
| 6,523,147 B1 * | 2/2003 | Kroeger et al. ............. 714/792 |

OTHER PUBLICATIONS

A. Lapidoth et al. Reliable Communication Under Channel Uncertainty IEEE Transactions on Information Theory, vol. 44, No. 6 Oct. 1998.
Clark et al., Error-Correction Coding for Digital Communications Plenum Press, 1981, pp. 26-27.

* cited by examiner

*Primary Examiner*—Jay K. Patel
*Assistant Examiner*—David B. Lugo

(57) ABSTRACT

A clipped metric function is utilized to mitigate the adverse effects of impulsive noise (e.g., lightening, motor vehicle ignition noise) on communications signals. The clipped metric function may be used alone or in conjunction with conventional signal clipping. In one embodiment, a clipped Euclidean metric function is determined as a function of the input signal. The input signal is processed in accordance with the clipped Euclidean metric function, to provide a clipped metric signal. The clipped metric signal is processed in accordance with application dependent requirements. The clipped metric function provides improved performance over conventional signal clipping. For example, utilization of a clipped metric function provides improved performance in situations in which the impulsive noise does not increase the amplitude of the input signal to a level that would be clipped by signal clipping.

4 Claims, 6 Drawing Sheets

METHOD AND SYSTEM FOR PROCESSING A SIGNAL

FIELD OF THE INVENTION

The present invention relates generally to the field of signal processing, and more specifically to quantization of communications signals in the presence of impulsive noise and interference.

BACKGROUND

Signal processing methods implemented in practical communications systems are typically designed under the assumption that underlying noise and interference statistics are Gaussian. Although this assumption finds strong theoretical justification in the Central Limit Theorem, the noise and interference processes commonly present in modem mobile communications systems are often not Gaussian, but more impulsive in nature. Examples of such impulsive noise and interference include motor vehicle ignition noise, switching noise from electromechanical equipment, lightening, and heavy bursty interference. Current signal processing systems are typically not optimally designed for channels having this type of noise and interference, because the implemented signal processing techniques assume the noise statistics are Gaussian.

Many techniques developed to cope with impulsive noise are ad hoc, largely based on signal clipping and preprocessing prior to the application of Gaussian based techniques. Clipping involves quantizing the amplitude values of the input signal. Clipping replaces the amplitude value of an input signal, which is above or below a threshold value, or values, with a respective constant value. The constant value(s) are processed in lieu of the actual amplitude value(s) of the input signal. The input signal, with clipped values, is typically processed under the assumption that the statistics of the noise are Gaussian. A disadvantage of clipping is that it introduces significant distortion to the input signal, thus adversely affecting the processing performance of the communication system.

Clipping the amplitude of the input signal is only effective if the amplitude of the input signal is above or below the specific threshold values. These threshold values are typically determined by the limits of the hardware used in a receiver of a communications system. That is, the threshold values are often determined to take advantage of the full dynamic range of the analog to digital (A/D) converter(s) of the receiver. Thus, if impulsive noise, added to the input signal, does not cause the amplitude of the signal to exceed a specific threshold, clipping will not be implemented. This adversely affects processing performance, because the input signal being processed is contaminated with impulsive noise.

A need exists therefore, for a system and method of processing signals to alleviate impulsive noise distortion without suffering the above described disadvantages.

SUMMARY OF THE INVENTION

A method and system for processing a signal utilizes a clipped metric function to mitigate the adverse effects of impulsive noise. In one embodiment, a clipped metric function is determined as a function of the input signal. The input signal is processed in accordance with the clipped metric function, to provide a clipped metric signal. The clipped metric signal is processed in accordance with application dependent requirements.

BRIEF DESCRIPTION OF THE DRAWINGS

The invention is best understood from the following detailed description when read in connection with the accompanying drawings. Included in the drawings are the following figures.

DETAILED DESCRIPTION

Figure 1:
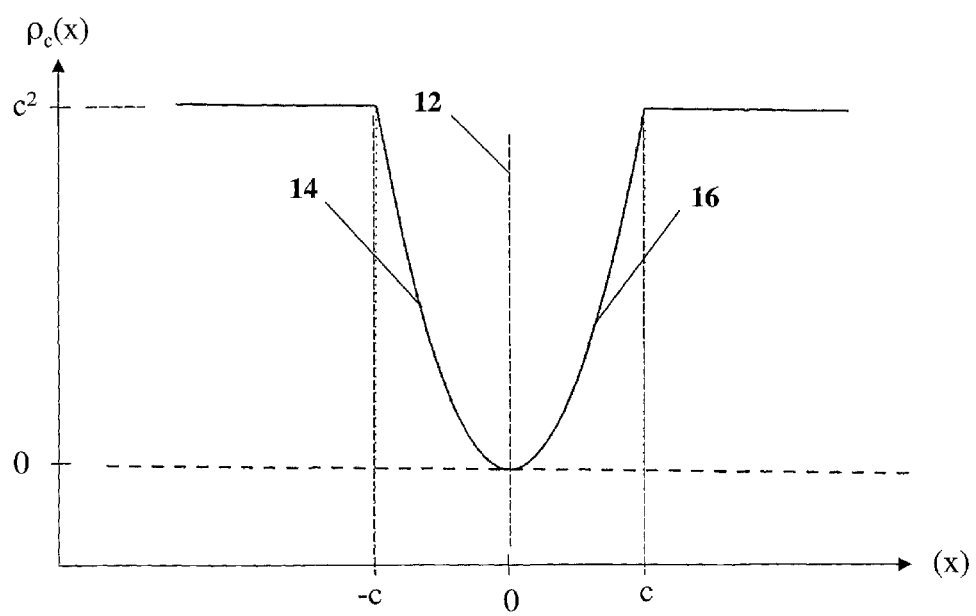
FIG. 1 is a graph of a clipped metric function in accordance with one embodiment of the present invention.

FIG. 1 is a graph of a clipped metric function, $\rho_c(x)$, in accordance with one embodiment of the present invention. The function, $\rho_c(x)$, of the input signal, x, is mathematically represented by the following equation.

$$\rho_c(x) = \begin{cases} x^2 & \text{for} : |x| \leq c \\ c^2 & \text{for} : |x| > c, \end{cases} \quad (1)$$

where $\rho_c(x)$ represents the clipped metric function as a function of x, x represents an amplitude of the signal, and c is a predetermined constant value. Thus, as evident from FIG. 1 and equation (1), $\rho_c(x)$ is equal to $x^2$ for values of x between −c and c, inclusive; and $\rho_c(x)$ is equal to $c^2$ for values of x greater than c and less than −c.

The clipped metric function, $\rho_c(x)$, can be used in the metric domain to mitigate the adverse affects of noise, similar to the use of signal clipping to mitigate noise in the symbol domain. The clipped metric function, $\rho_c(x)$, may be used alone or in conjunction with signal clipping. As described in more detail herein, use of the clipped metric function, $\rho_c(x)$, provides significantly superior performance compared to signal clipping in terms of mitigating the adverse effects of impulsive noise and outlier management in decoder and demodulation systems.

In typical communications systems information is encoded and modulated prior to transmission and received information is demodulated and decoded subsequent to transmission. Examples of known encoding/decoding and modulation/demodulation schemes include binary phase shift keying (BPSK) and quadrature phase shift keying (QPSK). In BPSK, information is encoded and modulated to one of two possible symbols (e.g., logic 1, logic 0). In QPSK, information is encoded and modulated to one of four possible symbols. When transmitted information is corrupted by noise, error is introduced into the demodulation/decoding process. It is desireable to minimize the error between the actual demodulated, decoded information and the intended demodulated, decoded information.

One attempt to minimize error utilizes a cost function based on the well-known Euclidean metric function, $\rho(x)$, defined as $\rho(x)=x^2$. In this type of situation it is generally accepted that a robust metric function provides better performance than a non-robust metric function. A robust metric function grows slowly for large values of x. It is clear that the Euclidean metric function, $\rho(x)$, does not grow slowly for large values of x. However, a clipped metric function, in accordance with the present invention is robust. For large values of x, the clipped metric function $\rho_c(x)$ is constant, thus providing a metric function that effectively mitigates the adverse effects of impulsive noise. At high signal to noise ratios (SNRs), it is highly unlikely that the value of |x| will be greater than the value of the constant, c. Thus, at high SNRs, the clipped metric function, $\rho_c(x)$, effectively achieves the same performance as the Euclidean metric function, $\rho(x)=x^2$.

In many current systems, signal clipping is the only defense against impulsive noise. Although decoder performance is better with signal clipping compared to without signal clipping, it is far from optimal. With the trend in wireless communications moving towards larger bandwidths, very large dynamic ranges at the output of the A/D converters, and high mobility, signal clipping will not be able to handle impulsive noise effectively. Signal clipping introduces a significant amount of distortion to the received signal prior to any signal processing. This is illustrated by way of example. Consider BPSK modulation. The demodulated signal for a symbol, i, is mathematically represented by the following equation.

$$r_i = b_i + n_i \qquad (2)$$

where $r_i$ represents the $i^{th}$ symbol, $b_i = \pm 1$, and $n_i$ represents the the background noise (not necessarily Gaussian). Consider the case, in which signal clipping is not utilized. Based on the received signal, a typical receiver computes the metrics $\rho(r_i-1)$ and $\rho(r_i+1)$. The metrics, $\rho(r_i-1)$ and $\rho(r_i+1)$, may be thought of as the distance between the received signal, $r_i$, and the signal constellations $\beta_1=+1$ and $\beta_2=-1$, respectively. A typical receiver utilizing the well know Viterbi algorithm at the decoding stage, computes the distances between the received signal and each element of the signal constellation at a previous step. A more detailed description of typical receiver processing may be found in the text "*Digital Communication*" by John G. Proakis, fourth edition, pp. 248, 482. Of particular interest, is the difference between these two metrics, represented by the following equation.

$$\rho(r_i+1) - \rho(r_i-1) \qquad (3)$$

Using the Euclidean metric, $p(x)=x^2$, on equation (3) results in the following equation.

$$(r_i+1)^2 - (r_i-1)^2 = 4r_i \qquad (4)$$

Thus, impulsive noise having a relatively large positive value of $r_i$ results in $\rho(r_i+1)-\rho(r_i-1)$ having a relatively large positive value, which is then passed on to the decoder. In essence, a large impulse exerts a great deal of influence on the decoder and one symbol with significant impulsive noise may negate the contributions from other symbols.

Now, consider the case where signal clipping is utilized and the signal is clipped to the values of $\pm k$. Accordingly, the Euclidean metric, $\rho(x)$, lies in the range of $\pm 4k$, inclusive. Even though the impact of impulsive noise within the decoder is limited, the Euclidean metric, $\rho(x)$, is representative of the impulsive noise rather than the symbol transmitted. Thus impulsive noise results in misinformation (corrupted information) that is passed to the subsequent stages of signal processing.

In the uncoded case (i.e., the case in which the estimation of $b_i$ uses only $r_i$ to make a decision about the binary data that was transmitted), a very large positive value of $r_i$ results in the receiver deciding that $b_i = +1$. If this large positive value of $r_i$ is caused by impulsive noise, a very large value of $r_i$ is equally likely for $b_i = \pm 1$. Accordingly, the probability of error is 50%. Even with signal clipping, the probability of error remains 50% because a received symbol affected by positive impulsive noise is clipped to $+k$, which is detected as $+1$. This example illustrates the fragility of Gaussian based algorithms in the presence of impulsive noise.

Figure 2:
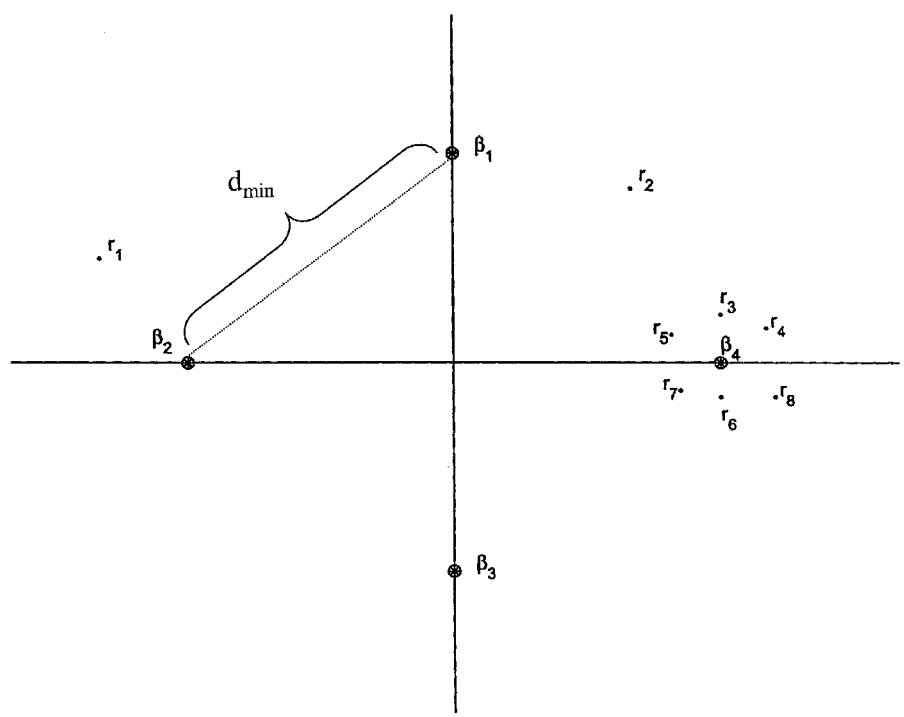
FIG. 2 is an illustration of an exemplary signal constellation resulting from utilization of quadrature phase shift keying (QPSK)

Next, consider an example utilizing the QPSK signal constellation shown in FIG. 2. The four possible demodulated symbols are represented by $\beta_1$, $\beta_2$, $\beta_3$, and $\beta_4$. The minimum distance between any two symbols in the constellation is $d_{min}$. The eight samples, $r_i$ (i=1 ... 8), represent an unknown transmitted symbol. As is clearly evident in FIG. 2, the desired demodulated symbol is $\beta_4$ (i.e., samples $r_3$ through $r_8$ are within relatively close proximaty to $\beta_4$, and only $r_1$ and $r_2$ are outliers). Determining that $\beta_4$ is the desired symbol may be accomplished by utilizing the clipped metric function, $\rho_c(x)$, wherein $c < d_{min}/2$, and computing the clipped cumulative metric functions, $\lambda_j$, for j=1,2,3,4, in accordance with the following equation.

$$\lambda_j = \sum_{i=1}^{8} \rho_c(r_i - \beta_j) \text{ for } j = 1, 2, 3, 4, \qquad (5)$$

where $\lambda_j$ represent the cumulative metric function for a respective symbol $\beta_j$, As can be seen by evaluating equation (5) and FIG. 2, the value for $\lambda_4$ is less than the value for each of $\lambda_1$, $\lambda_2$, and $\lambda_3$, thus indicating that $\beta_4$ is the desired symbol. Utilizing the clipped metric function results in the treatment of the gross errors, represented by $r_1$ and $r_2$, as outliers. The value of $\rho_c(r_i - \beta_j)$ is always equal to $c^2$, for i=1, 2 and j=1, 2, 3, 4. Therefore, $r_1$ and $r_2$ contribute equally to all metrics, which is equivalent to discarding $r_1$ and $r_2$.

Utilization of the clipped metric function, in accordance with the present invention, also provides defense against error bursts. For example, consider QPSK modulation, wherein eight samples are received corresponding to an unknown transmitted symbol, and all of the samples during the symbol period are heavily contaminated by impulsive noise (e.g., lightening). In this case, a decoding system without metric clipping would first demodulate a value based on $r_1, r_2 \ldots r_8$. This value is then passed on to a decoder, such as a Viterbi decoder, which may result in very distorted output values.

Utilizing a clipped metric function, in accordance with the present invention, and assuming all samples lie outside a distance "c" from each point in the constellation, the values of the clipped metric function for all samples and all signal constellation points are equal. The result being represented in the following equation.

$$\lambda_1 = \lambda_2 = \lambda_3 = \lambda_4 = 8\rho_c(c) = 8c^2 \qquad (6)$$

Thus, the decoder treats the corresponding symbol as an erasure (because the values are equal) and leaves the task of estimating its value to the coded structure in adjacent symbols.

Figure 3:
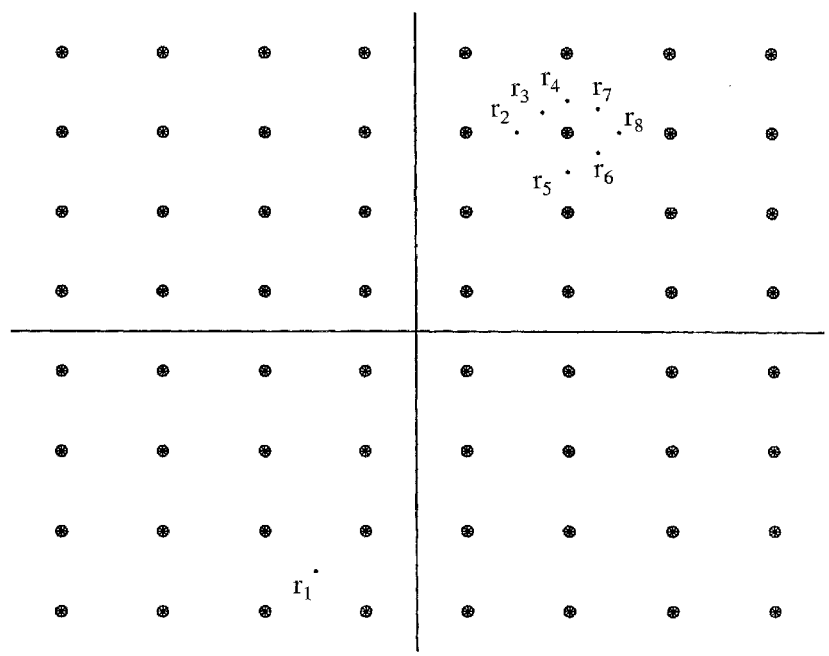
FIG. 3 is an illustration of an exemplary signal constellation resulting from utilization of a modem standard such as V.34 or V.90.

The previous example illustrated the use of a metric clipping for a relatively small signal constellation, such as QPSK. Next, consider a much larger constellation, as shown in FIG. 3, such as those used in the V.34 and V.90 modem standards. In this situation, a metric clipping offers a dramatic improvement over signal clipping. Referring to FIG. 3, the eight points, $r_1$ through $r_8$, represent received samples of the same transmitted symbol. It is readily observable that seven ($r_2$ through $r_8$) of the eight samples are in close vicinity to the constellation point representing the transmitted symbol, however, one sample, $r_1$, is in gross error, caused by impulsive noise.

Conventional signal clipping is unable to overcome the adverse effects of this gross error. Signals inside the constellation are not clipped. This single gross error has a large contribution to the cost function. So much, that another constellation point may have a small associated cost. Thus, utilizing only signal clipping, a single gross error within the constellation may be catastrophic and negate contributions from other samples.

A clipped metric function, in accordance with the present invention, provides a simple and effective method for removing the effects of this gross error. Utilizing the clipped metric function, $p_c(x)$, it is clear that the gross error will contribute $c^2$ to the cost function, $\lambda$, representing the transmitted constellation point. Assuming that the other seven samples are sufficiently good (i.e., noise free), then those seven samples are sufficient to ensure that the cost function of the transmitted point is minimum. Therefore, the effect of the gross error is eliminated through the use of a clipped metric function, in accordance with the present invention.

Figure 4A:
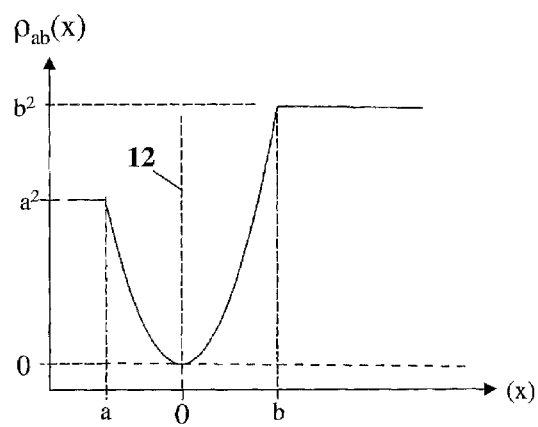
FIG. 4A is a graph of a clipped metric function, in accordance with the present invention, having different constant values, "a" and "b", wherein the value of "b" is greater than the value of "a"
Figure 4B:
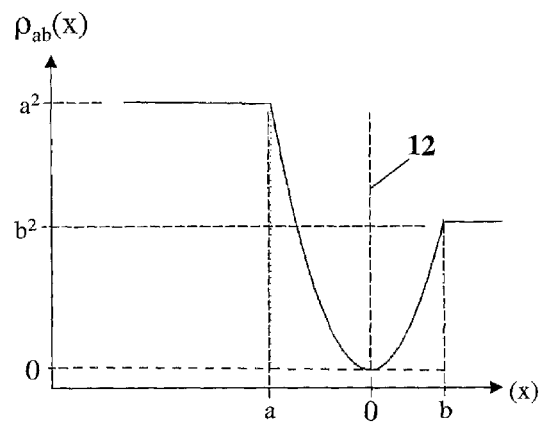
FIG. 4B is a graph of a clipped metric function, in accordance with the present invention, having different constant values, "a" and "b", wherein the value of "a" is greater than the value of "b"

A clipped metric function in accordance with the present invention, is not limited to the function, $\rho_c(x)$, depicted in FIG. 1. In another embodiment, for example, a clipped metric function, $\rho_{ab}(x)$, in accordance with the present invention may comprise different constant values, as shown in FIGS. 4A and 4B. Referring to FIG. 4A, the value of the constant "a" is less than the value of the constant "b". However, the value of constant "a" may be greater than the value of constant "b", as shown in FIG. 4B. The function, $\rho_{ab}(x)$, of the input signal, x, is mathematically represented by the following equation.

$$\rho_{ab}(x) = \begin{cases} x^2 & for\ : a \leq x \leq b \\ a^2 & for\ : x < a \\ b^2 & for\ : x > b, \end{cases} \quad (7)$$

where $\rho_{ab}(x)$ represents the clipped metric function as a function of x, x represents an amplitude of the signal, and "a" and "b" are predetermined constant values. Furthermore, the value of the metric function for values of x between the constant values need not be $x^2$, but more generally, may be any function, or functions, which are monotonically increasing from the centerline 12 to the respective constant value. Thus, referring again to FIG. 1, the portion of the clipped metric function, $\rho_c(x)$, labeled 14 may be any monotonically increasing function of x from the centerline 12 to the constant value, −c. Similarly, the portion of the clipped metric function, $\rho_c(x)$, labeled 16 may be any monotonically increasing function of x from the centerline 12 to the constant value, c. The portions 14 and 16 need not be symmetric about centerline 12. Example monotonically increasing functions of x include log (x) and log ($c^2+x^2$). This, more general clipped metric function is mathematically represented in terms of $f_1(x)$, a monotonically increasing function of x from the centerline 12 to the constant "a", and $f_2(x)$, a monotonically increasing function of x from the centerline 12 to the constant "b", by the following equation.

$$\rho_{ab}(x) = \begin{cases} f_1(x) & for\ : a \leq x \leq 0 \\ f_2(x) & for\ : 0 \leq x \leq b \\ f_1(a) & for\ : x < a \\ f_2(b) & for\ : x > b, \end{cases} \quad (8)$$

where $\rho_{ab}(x)$ represents the clipped metric function as a function of x, x represents an amplitude of the signal, "a" and "b" are predetermined constant values, $f_1(x)$ represents a monotonically increasing function of x from the centerline 12 to the constant "a", $f_2(x)$ represents a monotonically increasing function of x from the centerline 12 to the constant "b", $f_1(a)$ represents $f_1(x)$ evaluated at x=a, $f_2(b)$ represents $f_2(x)$ evaluated at x=b, and $f_1(x)=f_2(x)$ for x=0.

Figure 5:
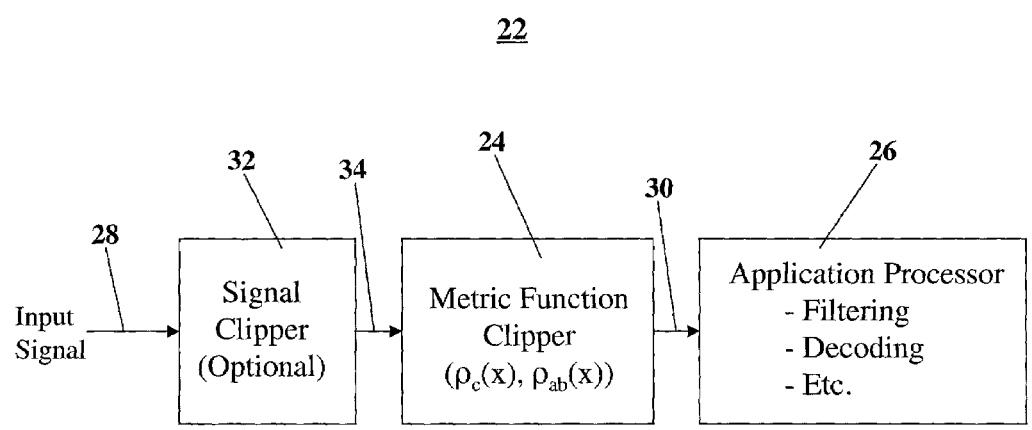
FIG. 5 is a block diagram of an exemplary system for processing a signal utilizing a clipped metric function in accordance with the present invention.

FIG. 5 is a block diagram of a system 22 for processing a signal utilizing a clipped metric function in accordance with the present invention. Input signal 28 is provided to optional signal clipper 32. The input signal 28 may comprise, for example, an encoded, modulated communications signal, such as a BPSK or QPSK signal. The received signal 28 may be clipped by signal clipper 32. Signal clipping, as performed by signal clipper 32 is optional. Signal clipping may include clipping the input signal 28 to predetermined values, such as ±k, or to different values, such as $k_1$ and $k_2$.

The optionally clipped signal 34 is provided to the clipped metric function module 24. Metric function clipper 24 receives signal 34, forms a clipped metric function, and provides a clipped metric signal 30 to be processed in accordance with application dependent processing by application processor 26. The clipped metric function formed by metric function clipper 24, may be any appropriate clipped metric function, such as $\rho_c(x)$ or $\rho_{ab}(x)$, as previously described herein. The type of processing accomplished by application processor 26 is dependent upon the type of application. For example, application processor 26 may perform filtering and decoding of the clipped metric signal 30.

Figure 6:
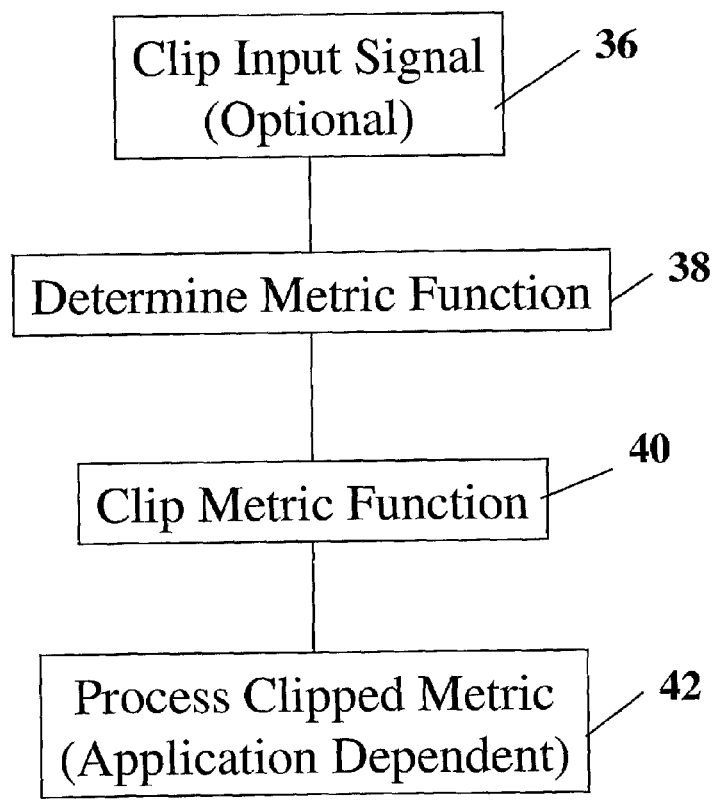
FIG. 6 is a flow diagram of an exemplary process for processing a signal utilizing a clipped metric function, in accordance with the present invention.

FIG. 6 is an exemplary flow diagram of a process for processing a signal utilizing a clipped metric function, in accordance with the present invention. The input signal, such as input signal 28 of FIG. 5, is optionally clipped at step 36. An appropriate metric function is determined for the optionally clipped signal at step 38. Examples of appropriate metric functions include any of the previously described metric functions, such as the Euclidean metric function $\rho(x)$, the monotonically increasing function, $f_1(x)$, the monotonically increasing function, $f_2(x)$, log (x), log ($c^2+x^2$), or any combination thereof. The determined metric function is clipped at step 40, and a clipped metric is processed in accordance with application dependent requirements at step 42. The determined metric function may by clipped in accordance with any of the previously described clipped metric functions, such as $\rho_c(x)$ or $\rho_{ab}(x)$, for example.

A clipped metric function, in accordance with the present invention, may be embodied in the form of computer-implemented processes and apparatus for practicing those processes. The clipped metric function may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes an apparatus for practicing the invention. A clipped metric function, in accordance with the present invention, may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits. A clipped metric function, in accordance with the present invention, may be embodied in the form of hardware, such as application specific integrated circuits (ASICs), generally programmable circuits (e.g., integrated circuits), field programmable gate arrays (FPGAs), programmable logic devices (PLDs), and the like, or any combination thereof.

Although illustrated and described herein with reference to certain specific embodiments, the system and method for processing a signal as described herein is nevertheless not intended to be limited to the details shown. Rather, various modifications may be made in the details within the scope and range of equivalents of the claims and without departing from the spirit of the invention.

What is claimed is:

1. A method of processing a received signal characterized by signal levels that encode distinct values, the received signal being subject to noise, said method comprising the steps of:
   processing said signal by applying a clipped metric function to the signal levels, thereby providing a clipped metric signal; and
   processing said clipped metric signal to decode the distinct values therefrom, whereby said clipped metric function reduces an effect of said noise;
   wherein said clipped metric function is in accordance with the following equation:

$$\rho_c(x) = \begin{cases} x^2 & \text{for} : |x| \le c \\ c^2 & \text{for} : |x| > c, \end{cases}$$

wherein:
   $\rho_c(x)$ represents said metric as a function of x;
   x represents an amplitude of said signal; and
   c represents a predetermined constant value.

2. A method in accordance with claim 1, further comprising applying said method to a signal encoded in accordance with at least one encoding scheme selected from a group consisting of binary phase shift keying and quadrature phase shift keying.

3. A computer readable medium having embodied thereon a program for causing a processor to process a signal having signal levels encoding signal values but wherein said signal levels are subject to noise, said computer readable medium comprising:
   means for causing said processor to process said signal levels in accordance with a clipped metric function for providing a clipped metric signal; and
   means for causing said processor to process said clipped metric signal so as to derive the signal values from the clipped metric signal;
   wherein said clipped metric function is in accordance with the following equation:

$$\rho_c(x) = \begin{cases} x^2 & \text{for} : |x| \le c \\ c^2 & \text{for} : |x| > c, \end{cases}$$

wherein:
   $\rho_c(x)$ represents said metric as a function of x;
   x represents an amplitude of said signal; and
   c represents a predetermined constant value.

4. A computer readable medium in accordance with claim 3, wherein said program is operable for use with a signal encoded in accordance with at least one encoding scheme selected from a group consisting of binary phase shift keying and quadrature phase shift keying.

* * * * *